United States Patent [11] 3,612,096

| [72] | Inventor | Arthur S. Kish<br>Lyndhurst, Ohio |
|---|---|---|
| [21] | Appl. No. | 846,178 |
| [22] | Filed | July 30, 1969 |
| [45] | Patented | Oct. 12, 1971 |
| [73] | Assignee | Murray Corporation<br>Cockeysville, Md. |

[54] PILOT OPERATED FLOW CONTROL VALVE
4 Claims, 6 Drawing Figs.

[52] U.S. Cl. .................................................... 137/454.5,
137/491, 251/61.3
[51] Int. Cl. ..................................................... F16k 31/38
[50] Field of Search ........................................... 137/454.5,
491; 92/34, 40; 251/61, 61.3, 61.4, 61.5

[56] References Cited
UNITED STATES PATENTS

| 2,065,087 | 12/1936 | May ............................ | 92/40 X |
| 2,201,728 | 5/1940 | Hoesel ........................ | 92/40 X |
| 2,366,596 | 1/1945 | Clifton ....................... | 137/491 |
| 2,923,306 | 2/1960 | Mitchell ..................... | 137/491 X |
| 2,969,950 | 1/1961 | Gilbert et al. ............. | 251/61.3 |
| 3,211,173 | 10/1965 | Mueller et al. ............ | 137/454.5 |
| 3,221,763 | 12/1965 | Widdowson ............... | 137/491 X |

*Primary Examiner*—Robert G. Nilson
*Attorney*—Isler and Ornstein

ABSTRACT: A valve is provided which is characterized by the use of an external housing of simple construction, and which can be easily taken apart to provide access to the parts within the housing. The interior of the valve is composed of units or subassemblies which can be quickly and easily removed for repair or replacement and without any possibility of the elements constituting such units or subassemblies becoming disconnected from each other and falling apart. A particular feature is a slide valve subassembly consisting of a valve body, piston valve, bellows housing and adjusting valve assembled as a complete easily handled unit. Still another feature is the elimination of certain springs used in similar valves, to reduce the cost of the valve, without impairment of the functioning thereof.

PATENTED OCT 12 1971 3,612,096

INVENTOR.
ARTHUR S. KISH
BY
Isler & Ornstein
ATTORNEYS

INVENTOR.
ARTHUR S. KISH
BY
Isler & Ornstein
ATTORNEYS

PILOT OPERATED FLOW CONTROL VALVE

A pilot operated flow control valve of the type to which the present invention relates is disclosed in the Widdowson U.S. Pat. No. 3,221,763.

The valve thus disclosed has several disadvantages, including the following:

a. The external valve housing consists of a number of parts of somewhat complicated construction, which are permanently bonded together, and are therefore impossible to disassemble, in the event that repair or replacement of some of the interior parts or readjustment or reconditioning become necessary. The valve, in other words, is destroyed upon any attempt to disassemble the housing.

b. The patent does not disclose an external equalizer port, without which use or operation of the valve would be difficult.

c. The patent discloses the use of a number of parts, including springs 88 and 50, which I have found to be unnecessary to the efficient functioning of the valve, and which not only interfere with the assembly and disassembly of the valve, but add appreciably to the overall cost of the valve.

d. Upon any attempt to separate or break the bond between the parts 26 and 38 of the housing of the valve, the parts within the housing would fall apart, since there is nothing to maintain them in assembled or unitary condition.

The present invention has as its primary object the provision, in a valve of the character described, of an external valve housing of simple construction, in which certain of the parts can be quickly and easily assembled and reassembled, in the event that repair or replacement of some of the interior parts or readjustment or reconditioning becomes necessary.

Another object of the invention is to provide a valve of the character described, wherein certain springs, found in similar valves, are eliminated, without interfering with the assembly, disassembly or function of the valve, thereby reducing the cost of the valve, without impairment of the operating function of the valve.

A further object of the invention is to provide a valve of the character described, having a slide valve subassembly which can be quickly and easily removed as a unit or cartridge, for readjustment, replacement and reconditioning purposes.

A further object of the invention is to provide a valve of the character described, in which static seals are employed at crucial or important points, to thereby properly seal the various subassemblies within the main assembly, or permit disassembly and adjustment of pressure settings within the valve.

A still further object of the invention is to provide a valve of the character described, in which disassembly of the external housing does not result in the parts within such housing falling apart from each other.

Other objects and advantages of my invention will be apparent during the course of the following description.

In the accompanying drawings forming a part of this specification, and in which line numerals are employed to designate like parts throughout the same, FIG. 1 is a side elevational view of a pilot operated flow control valve embodying the invention;

Figure 1:
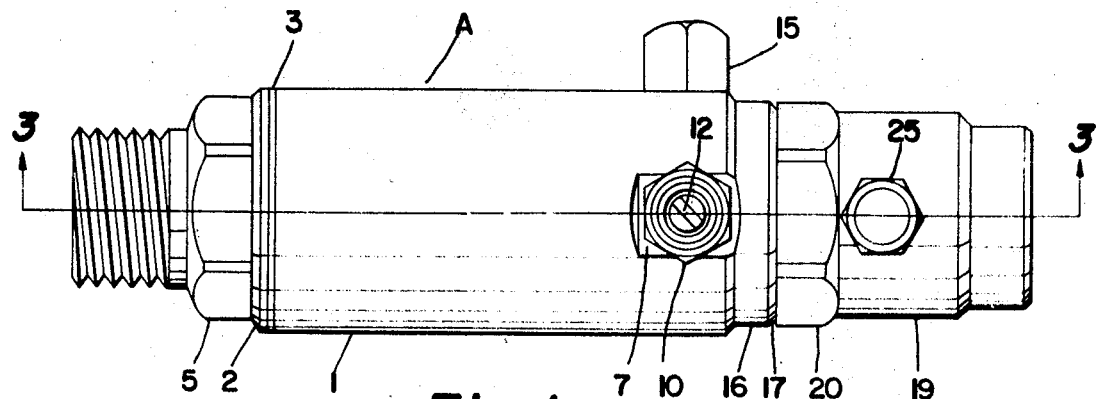
Figure 2:
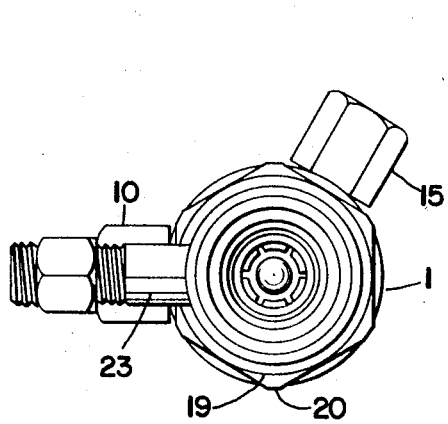
FIG. 2 is an end elevational view of the valve, as viewed from the right end of FIG. 1.

In describing the invention hereinafter, the terms "upper" and "lower," "right" and "left" are relative in that they relate to the position of the described parts relative to one another and as shown in the drawing. The flow control device may be positioned in virtually all directions of overall orientation, i.e. vertical or horizontal, etc., when in actual use.

Referring more particularly to the drawings, reference character A designates a valve body subassembly comprising a tubular housing 1 having an outlet adapter 2 secured in its upper end and brazed to the latter, as by means of a copper braze wire ring 3. The adapter 2 is threaded internally, as at 4, and has threadedly secured therein an outlet fitting 5, and O-ring 6 interposed between the fitting 5 and the adapter 2 to provide a fluidtight seal therebetween.

The housing 1 is formed adjacent its lower end to provide a flat surface 7 having an aperture 8 having brazed thereto, as by a copper braze wire ring 9, an oil port adapter or fitting 10, which is connected to an oil bleed line or conduit (not shown) from the evaporator of an automotive refrigeration system, for drawing any liquid such as a mixture of refrigerant and lubricant which may collect in the bottom of the evaporator under certain conditions of operation. The adapter or fitting 10 has a reduced extension 11 which is fitted in the aperture 8, and is also provided with a valve core 12 similar to a tire valve.

Figure 4:
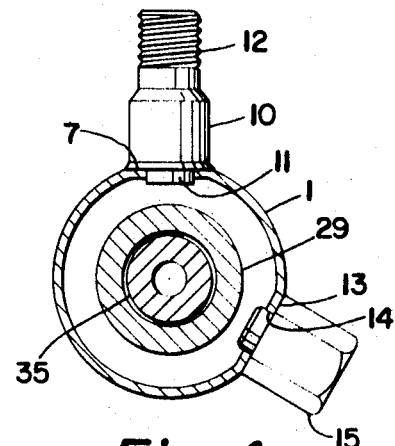
FIG. 4 is a transverse cross-sectional view, taken on the line 4—4 of FIG. 3.

The housing 1 is also formed at a point spaced circumferentially from and in the same diametral plane as the oil port adapter 10, to provide a flat surface 13, having an aperture 14, this flat surface 13 having brazed thereto, a port adapter or fitting 15 having a reduced extension which is fitted in the aperture 14 (see FIG. 4). The port adapter or fitting 15 is an equalizer line connecting port, which connects with a line (not shown) from the expansion valve of the refrigeration system.

Below the adapters 10 and 15, the housing 1 has a portion 16 of reduced diameter, within which is secured, as by a copper braze wire ring 17, the annular upper end 18 of an inlet adapter 19, which is of generally circular configuration, but has a portion 20 of hexagonal external cross section, for a purpose to be presently described. The upper end 18 of the inlet adapter 19 is of reduced wall thickness, so as to provide a seat or shoulder 21 for a purpose to be presently described. The inlet adapter 19 is provided with a wall opening 22 in which is mounted a valve port adapter 23, the axis of which is in a plane aligned longitudinally with that of the adapter 10. The adapter 23 is provided with a valve core 24, similar to a tire valve, and is normally covered with a cap 25, between which and the outer end of the adapter an O-ring seal 26 is interposed. The adapter 23 is a service valve port, for charging the refrigeration system with a refrigerant. The inlet adapter is further provided with internal threads 27, which extend upwardly to a point slightly below the level of the seat or shoulder 21.

Disposed within the valve body subassembly A is a slide valve subassembly B, generally designated by reference character B.

The slide valve subassembly comprises a valve body 28 in the form of a double cylinder, having a small cylindrical portion 29 and large cylindrical portion 30. The small cylindrical portion 29 rests on the shoulder 21 of the inlet adapter 19, and is provided with three ports or passageways 31, spaced apart 120° circumferentially, and providing communication between the inlet adapter 19 and an annular passageway 32 between the inner wall of the upper end 18 of the inlet adapter and the outer wall of the cylindrical portion 29 of the valve body 28.

Below the portion 29 of the valve body 28, the valve body is provided with a threaded extension 33 of reduced diameter which is secured to the threads 27 of the inlet adapter 19, an O-ring 34 being interposed between the lower end of the portion 29 and the upper terminus of the threads 27 to provide a fluidtight seal between the valve body and the inlet adapter 19.

Mounted in the smaller cylinder 29 for slidable movement therein is a piston valve 35 which is adapted by downward movement wholly or partially close the ports 31 to thereby control the flow of fluid from the inlet adapter 19 to the passageway 32. This piston valve 35 has a hollow interior chamber 36 provided at its entrance with a screen 37 and having adjacent its upper end a radially extending passageway 38 which extends from the chamber 36 to an external groove 39, which communicates with a dashpot chamber 40 provided by the large cylinder 30.

Figure 5:
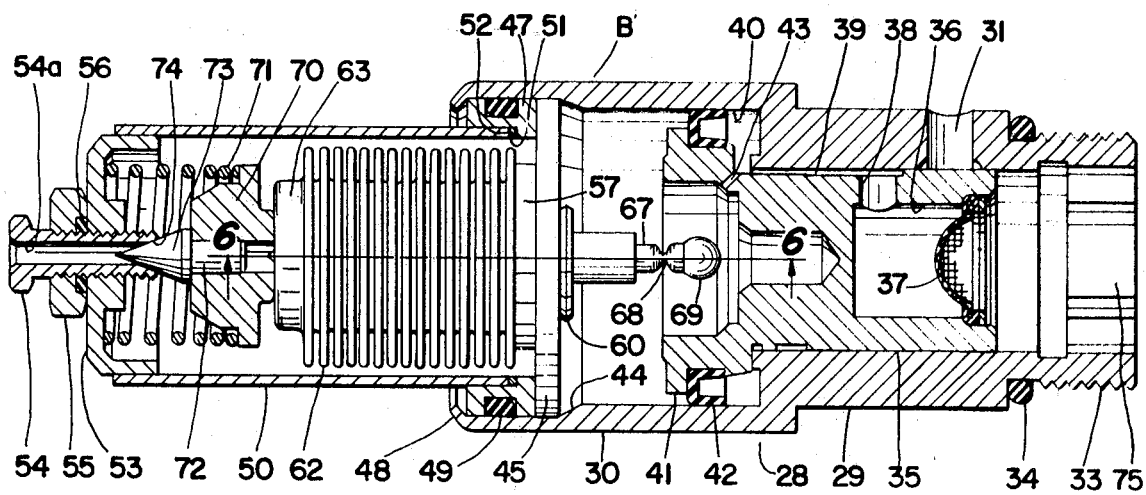
FIG. 5 is a cross-sectional view of the slide valve subassembly, taken on the line 5—5 of FIG. 3.
Figure 6:
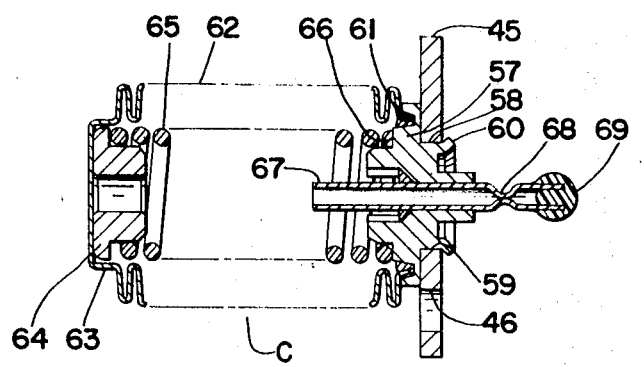
FIG. 6 is a fragmentary cross-sectional view of the bellows subassembly, taken on the line 6—6 of FIG. 5.

The piston valve 35 is provided at its upper end with an enlarged portion 41 which is movable in the dashpot chamber 40 and has mounted thereon a piston ring 42 of inverted U-shaped cross section formed of a suitable plastic such as polyurethane resin bearing against and coacting with the cylindrical wall of the dashpot chamber to complete the enclosure of the dashpot chamber. The space behind or to the right of the piston ring 42 as seen in FIG. 5 communicates with the space ahead of or to the left of the portion 41 of the valve 35 through an inclined passageway 43 in the valve 35.

The large cylindrical portion 30 is provided adjacent its upper end with a shoulder 44 on which a bellows assembly C is mounted. This bellows assembly, which is actually a part of the slide valve subassembly B, comprises a plate 45 having three holes 46 spaced equally circumferentially of the plate, and is held against the shoulder 44 by means of an O-ring flange 47, which is held in place within the portion 30 of the valve body 28 by crimping the upper end of the portion 30 inwardly against the flange 47, as at 48. An O-ring 49 mounted in the flange 47 provides a fluidtight seal between the flange and the portion 30 of the valve body.

The bellows assembly, which will be presently described in detail, is housed with a tube 50, which rests on a shoulder 51 of the flange 47 and is brazed to the shoulder by means of a copper braze wire ring 32. The tube 50 has brazed to the upper end thereof a plate 53. The plate 53 has threadedly mounted therein an adjusting screw 54 having an axial passageway 54a therethrough. The screw 54 may be adjusted to any desired position within the plate 53, and locked in adjusted position by means of a nut 55 which is threadedly secured to the screw 54. An O-ring seal 56 is interposed between the nut 55 and the plate 53 to provide a fluidtight seal between the plate, screw and nut.

The bellows assembly includes a disc 57 having an extension 58 which extends through a central opening 59 in the plate 45, and is crimped to the latter, as at 60. The disc 57 is provided with an annular recess 61 to which the lower end of a bellows 62 is secured, as by means of soldering in the recess 61.

The upper closed end of the bellows 62 is provided with a cylindrical extension 63 within which is disposed a spring stop 64. A compression coil spring 65 is interposed between the stop 64 and a shoulder or seat 66 of the disc 57.

A bellows evacuating tube 67 extends from a point within the bellows, through the disc 57 and to a point below the disc. This tube, which is used to evacuate the bellows to a pressure of 29 inches of mercury, is, after such evacuation, sealed by pinching it, as at 68, and dip soldering the lower end of the tube, as at 69.

The slide valve subassembly B further includes a pilot valve subassembly, which comprises a pin disc 70 which is resiliently maintained against the top of the bellows 62 by means of a compression coil spring 71 which is interposed between the plate 53 and the disc 70, and a valve stem 72 which is slidably mounted in the disc 70 and has a valve head 73 which bears against a valve seat 74 at the lower end of the axial passageway 55 of the screw 54.

As previously stated, the fitting 10 is connected with the bottom of the evaporator of the automotive refrigeration system for drawing any liquid such as a mixture of refrigerant and lubricant which may collect in the bottom of the evaporator under certain conditions of operation. This is made possible by the difference in pressure between the evaporator and the interior of the valve body when the holes 31 are closed or nearly closed by the piston valve 35.

The inlet fitting 19 is adapted for connection to the evaporator of the automotive refrigeration system, and the outlet fitting 5 is adapted for connection to the inlet of a sealed motor compressor unit (not shown) of the refrigeration system. The motor compressor unit delivers refrigerant to the condenser (not shown) of the refrigeration system from which liquified refrigerant flows under the control of a liquid flow control valve or device to the evaporator.

The screw 54 may be readily adjusted through the outlet fitting 5 to maintain any desired pressure within the tube 50, and after adjustment, may be easily locked in adjusted position by the locknut 55. This adjustment determines the pressure at which the enclosure provided by the bellows 62 will open and close the valve formed by the parts 73 and 54.

The difference in pressure between the bottom and top of the piston valve 35 controls the position of this piston valve to control the openings of the ports 31. When the pressure in the inlet 19 is high, the piston valve 35 will be moved a greater amount upwardly to expose a greater area of the ports 31. Through the leakage provided by the port 38, the passage 39, and passage 43, the pressure within the tube 50 will be responsive to the pressure within the inlet fitting 19. This pressure will exert its force upon the bellows 62 via passage 46 in plate 45. The deflection of the bellows will depend upon the force of the spring 71 and 65 which act in opposition to each other. The opening pressure of the valve provided by the parts 73 and 54 will be determined by the adjustment of the screw 54. As this screw is turned downwardly, the pressure will increase, whereas when the screw 54 is turned in the opposite direction, the opening pressure will decrease. This will determine the pressure maintained in the inlet fitting 19.

When the valve 73–54 is closed, the piston valve 35 will tend to close while when this valve is open, the piston valve 35 will open. The opening of the valve 35 is thus somewhat proportional to the opening of the valve 73–54. Since the bellows 62 is entirely within the valve body and particularly entirely within the enclosure formed by the parts 30 and 50, it is not exposed to atmospheric pressure and will not be affected by changes in barometric pressure or changes in altitude. This makes it possible to set the valve so as to keep the pressure within the evaporator sufficiently low to attain the coldest possible temperature without the accumulation of frost, and which will vary with different refrigerants.

OPERATION

The operation of the instant invention is described in connection with a conventional automotive air-conditioning system utilizing an engine driven magnetic clutch controlled compressor.

When the valve is on a car parked and the engine is not running, for example, in an ambient of 80° F. temperature, the pilot operated bellows is collapsed. The bellows can only exert a pressure of 28 lbs. to make the needle 73 close into the female seat 74. Thus, when the car is sitting out in the sunlight the valve is open because the pressure of the freon in a closed air-conditioning system is equal to ambient temperature. In other words, if it's 80° outside the pressure in equilibrium throughout the air-conditioning system is 80 p.s.i. Therefore, it can be seen that the pilot valve needle is out of its seat. When the motor is started, the electric clutch kicks in the compressor and this immediately starts to suck the freon through the usual evaporator core through the subject valve and pumps it into the conventional condenser to be condensed from a hot gas into a liquid freon and then transfers it to the receiver dehydrator. As soon as the compressor has drawn the suction pressure down to, for example, 27½ lbs. the bellows operated needle 73 will seat into its female seat 74. This, then, traps the pressure above or to the left of the flange portion of the piston 4. The little bleed hole 43 that is in the piston 4 allows the pressure at 27½ lbs. to bleed up through this hole but because the pressure is still dropping on the right side of the piston 4 a momentary unbalanced pressure exists across piston 4 driving same to the right (as shown in the drawing) because of the timelag required for the pressure to equalize via bleed port 43 on both sides of the piston 4. As the pressure increases in the evaporator it starts to build up from, say, 27½ to 27¾ to 27⅞ and it reaches 28 lbs. again. The bellows operated needle 73 retracts or is pushed out of the seat 74 by the pressure.

Now this opening of the pilot valve allows the pressure to the left of the piston to drop but the pressure to the right of the piston is instantaneously greater because of the restrictive action of bleed port 43 in permitting equalization of pressure across piston 4 so immediately the piston moves to the left.

The function of the valve is to maintain a 28-lb. pressure in the evaporator by the pilot needle valve opening and closing, and this also controls the piston which opens and closes almost simultaneously with the needle valve. It is very rapid motion caused by momentary pressure surges across piston 4. There is a chattering, actually, happening in the valve. It is slamming open, shut, open, shut, at a very rapid pace.

When, again the air conditioner is turned off the temperature starts to reach the freon and tries to make it go into equilibrium equal to the ambient temperature. Under these conditions the pilot needle valve will open and stay open and the piston will also open and stay open until the car is started again.

The advantages of the valve construction may be briefly described as follows:

The external valve housing is of simple construction, consisting primarily of a single tube 50 which is easily assembled with the parts 25 and 19, and can be quickly and easily disassembled and reassembled in the event that repair or replacement of some of the interior parts or readjustment or reconditioning becomes necessary. This is in marked contrast to the external valve housing of the Widdowson patent, which is of complicated construction, consisting of numerous parts which are permanently bonded together, and therefore impossible to disassemble, and which, in fact, must be destroyed upon any attempt to disassemble the housing.

Figure 3:
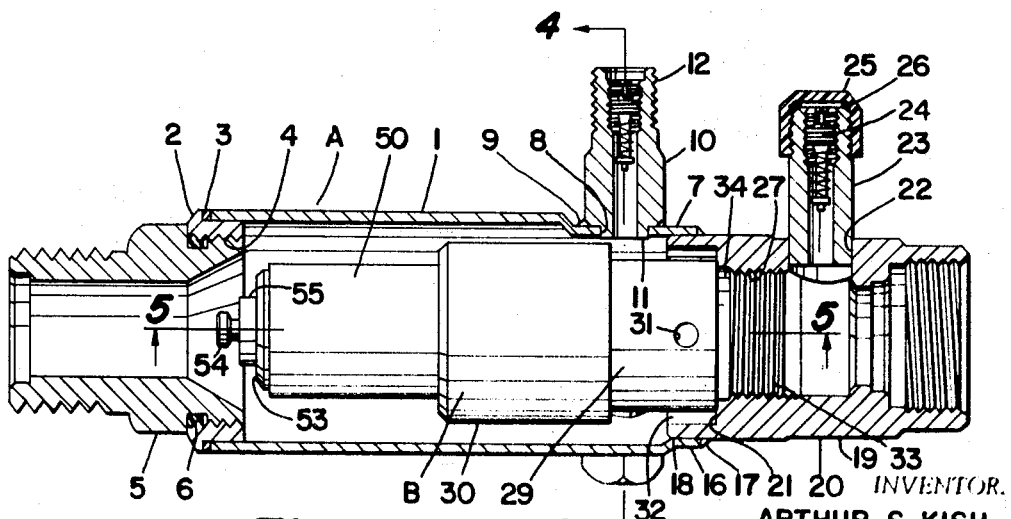
FIG. 3 is a cross-sectional view, taken on the line 3—3 of FIG. 1, but with the slide valve subassembly shown in elevation.

The valve of this invention does not require for its effective functioning or operation springs, such as the springs 50 and 88 of Widdowson, which springs not only interfere with the assembly or disassembly of the valve, but add appreciably to the overall cost of the valve. The spring 50 of Widdowson is not required, because, in the present valve, the entire slide valve subassembly B, shown in FIGS. 3 and 5, is threadedly secured to the inlet fitting 19, and is thus quickly and easily maintained in axial alignment with the inlet and outlet fittings. In the Widdowson valve, the parts corresponding to this subassembly are not only independent of each other, but are seated on a flange 56 of the inlet fitting 20, so that a strong spring 50 is required to hold the separate parts in assembled relation and in alignment with the inlet and outlet fittings.

In the present valve, the entire slide valve subassembly, as shown in FIG. 5, can be quickly and easily removed as a unit or cartridge, for readjustment, replacement or reconditioning purposes, which cannot be done with the Widdowson valve.

In the present valve, static seals, in the form of O-rings or gaskets, are employed at crucial or important points, whereas the failure to use such static seals in the Widdowson valve makes it virtually impossible to properly seal the various subassemblies within the main assembly, or permit disassembly and adjustment of pressure settings within the valve. The static seals, in question, are 6 and 34, which are used to seal the subassemblies within the main assembly, and are the points where the present valve can be disassembled, the pressure settings of the slide valve subassembly adjusted, or this subassembly replaced.

In the Widdowson valve, upon any attempt to separate or break the bond between the parts 26 and 38 of the housing of the valve, the parts within the housing would fall apart, since there is nothing to maintain them in assembled condition. This is avoided in the present valve.

It may be further noted that in the slide valve subassembly shown in FIG. 5, the part 29 has built into its front or lower end an hexagonal socket 75, for reception of a wrench, for the purpose of assembling or disassembling the slide valve subassembly. Moreover, this subassembly, due to the crimping 48, is tamperproof, so that the subassembly does not fall apart, as would happen in the Widdowson valve, if the housing were cut in two.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. A flow control device of the character described, comprising a tubular housing having an inlet and an outlet in coaxial alignment, inlet and outlet fittings removably secured to the respective ends of said housing, a pilot operated, slide valve subassembly disposed within said tubular housing and also coaxial therewith and with said inlet and outlet, said subassembly being threadedly secured to said inlet fitting and comprising a springless, pressure differential biased piston for regulating fluid flow through said device and a pilot operator for said piston, said operator including an adjustable, bellows controlled pilot valve means for establishing differential pressure across said piston whereby fluid flow between the inlet and outlet of said flow control device is regulated by movement of said piston, said subassembly being secured in said tubular housing solely by said threaded connection to said inlet fitting.

2. A flow control device as defined in claim 1, wherein said pilot operated, slide valve subassembly includes a cylindrical ported valve body and said piston is mounted within said valve body and moves linearly therein to regulate the flow of fluid through said ported, cylindrical valve body and further, wherein the said bellows of said bellows controlled pilot valve is cylindrical and coaxial with said piston and is mounted in said valve body by means of an apertured disclike plate, said valve body being crimped about the periphery of said disclike plate whereby pressure acting on said piston simultaneously acts on said bellows and said bellows is permanently secured within said valve body.

3. A flow control device, as defined in claim 2, wherein said bellows is surrounded by a cylindrical coaxial bellows housing also held in place by said crimped valve body, and said bellows housing has secured at the end thereof adjacent the outlet of said fluid flow device, a plate having a threaded central opening, an axially adjustable screw mounted in said opening, said screw having an axial passageway one end of which forms a valve seat, and wherein the end of said bellows adjacent said valve seat comprises a valve closure cooperating with said valve seat to regulate the pressure surrounding said bellows.

4. In a flow control device of the character described, a generally cylindrical housing having an inlet end and an outlet end, inlet and outlet fittings at least one of which is threadedly secured in said housing, a flow control means suspended in said housing intermediate of and coaxially aligned with said inlet and outlet fittings and comprising a pilot operated, pressure differential slide valve assembly removably engaged with said inlet fitting and positioned coaxially with respect to said inlet and said outlet, said slide valve assembly comprising a valve housing, a linearly reciprocating piston in said valve housing, a chamber on one side of said piston, a chamber on the opposite side of said piston, said piston having therethrough a port for a momentarily time delayed admission of fluid under pressure from one side to the other of said piston to create momentary differential pressure acting across said piston, pilot control means for regulating the fluid pressure acting on said piston, said pilot control means comprising a bellows housing in communication with the chambers to either side of said piston, a bellows within said housing, a fluid control means associated with the end of said bellows, means supported by said bellows housing cooperating with said fluid control means to regulate the pressure in said bellows housing and said chambers whereby fluid flow through said flow control device is regulated.